(12) United States Patent
Gochenour (10) Patent No.: US 7,530,438 B2
(45) Date of Patent: May 12, 2009

(54) SINGLE-PLANE RAMP NOISE REDUCTION FOR A CENTRIFUGAL CLUTCH

(75) Inventor: Daniel V. Gochenour, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 219 days.

(21) Appl. No.: 11/291,457

(22) Filed: Dec. 1, 2005

(65) Prior Publication Data
US 2007/0125617 A1 Jun. 7, 2007

(51) Int. Cl.
*F16D 43/10* (2006.01)
(52) U.S. Cl. .............................. 192/105 CP; 192/103 A
(58) Field of Classification Search ............ 192/105 CP
See application file for complete search history.

(56) References Cited

U.S. PATENT DOCUMENTS

| | | | |
|---|---|---|---|
| 2,987,155 A * | 6/1961 | Maurice et al. ................ | 192/31 |
| 4,646,891 A | 3/1987 | Braun | |
| 4,754,665 A | 7/1988 | Vandervoort | |
| 5,370,013 A | 12/1994 | Reynolds et al. | |
| 5,974,354 A | 10/1999 | Janecke et al. | |
| 5,974,906 A | 11/1999 | Stine et al. | |
| 6,015,366 A | 1/2000 | Markyvech et al. | |
| 6,022,295 A | 2/2000 | Liu | |
| 6,698,564 B2 * | 3/2004 | Kummer et al. ........... | 192/93 R |
| 6,880,687 B2 | 4/2005 | Markyvech et al. | |
| 2005/0199468 A1 * | 9/2005 | Gochenour et al. ..... | 192/105 B |
| 2006/0169570 A1 * | 8/2006 | AbuSamra et al. .... | 192/105 CP |

* cited by examiner

*Primary Examiner*—Richard M. Lorence
(74) *Attorney, Agent, or Firm*—Rader, Fishman & Grauer PLLC (57) ABSTRACT

An embodiment provides a drive train for a medium duty truck. The drive train includes an engine having an engine output member, and a centrifugal clutch. The clutch has a plurality of swing weights and a driving member. The driving member generally defines an axis and is rotatable with the engine output member. The clutch also includes a ramp portion having a generally planar ramped surface portion in selective engagement with at least a portion of the swing weights, and a clutch disk portion for transferring torque from the driving member to a driven member. The clutch is operable between an engaged condition and a disengaged condition. The swing weights are radially moveable with respect to the axis. Radial movement of the swing weights causes axial movement of at least a portion of the clutch between a disengaged position and an engaged position. The swing weights engage only the ramped surface portion when the at least a portion of the clutch is not in the disengaged position.

20 Claims, 5 Drawing Sheets

SINGLE-PLANE RAMP NOISE REDUCTION FOR A CENTRIFUGAL CLUTCH

TECHNICAL FIELD

The technical field is generally automotive drive trains, and particularly, clutch activation and configurations to reduce noise.

BACKGROUND

Centrifugally operated friction clutches are well known in the art of vehicular drive train systems. They typically include an input member driven by a prime mover, usually an electric motor or internal combustion engine, and weights rotatable with the input member which, upon rotation of the driving member, will move radially outwardly under the effect of centrifugal force to cause the input member to frictionally engage a driven output member. Automatically actuated centrifugal clutches employed with heavy-duty electromechanical highway line-haul truck transmissions include so-called centrifugal actuation modules that house the centrifugally actuated weights. The centrifugal modules are drivingly connected to an engine flywheel, and each of a plurality of centrifugally actuated weights is adapted to swing in an arc about a pivot link fixed to the module housing structure. As such, the so-called swing weights contained within the modules are radially outwardly movable against resistive spring forces as a function of engine speed-the higher the speed, the greater the outward movement between limits. Rollers attached to the weights are adapted to roll atop ramp segments that are cammed for clutch engagement and disengagement.

The swing weights are subjected to a number of forces, and thus give rise to competing concerns to achieve satisfactory operation of the modules over the useful life of a clutch. As an example, one feature of the above-described prior art centrifugal clutch is the use of two distinct frusto-conical ramp surfaces on the ramp segments. A first ramp surface exhibits a relatively steep slope and a second ramp surface exhibits a more gradual slope. These ramp surfaces are engaged by swing weight rollers and are used to create a clamp load as the centrifugal force acting on each swing weight increases. Particularly, as the centrifugal force increases, the swing weights will move from their original position on the relatively steep first ramp surface onto the more gradual sloping second ramp surface. Since a centrifugal clutch operates as a balance of forces, any tolerance in the centrifugal module components (e.g., swing weight springs, ramp segments, etc.) may cause a "staggered disengagement", wherein one or more of the swing weights moves from the second ramp surface to the first ramp surface before the other swing weights. This condition is exacerbated in a swing weight style centrifugal clutch since operation of each individual swing weight is essentially independent of the other swing weights.

Generally, the multi-ramp surface clutch described herein is used with a heavy duty truck (typically greater than about 30,000 lb GVW, more than about 10 liters engine displacement, and having an engine that develops maximum torque typically below about 1200 rpm). The multi ramp surface clutch, as disclosed in commonly owned U.S. Pat. No. 6,880, 687, the disclosure of which is hereby incorporated by reference in its entirety, permits an engine that develops maximum torque at a lower rpm to generate a sufficient clutch clamping force to transmit the maximum torque.

Another feature of the above-described prior art centrifugal clutch is the use of mechanical stops for the swing weights. As the swing weights move along the more gradual sloping second ramp surface during engine speed increase, it is desirable to provide a motion limiter for the swing weight to limit its radial travel relative the clutch. The stops prevent the full compression of the springs that are provided to return the swing weights to position during engine deceleration. The stops also provide for a maximum clutch engagement force, as the stops limit the axial displacement caused by the swing weight travel during engine speed increase.

When these stops are used in a medium duty truck (typically about 16,000 to about 30,000 lb GVW, and having an engine that develops maximum torque typically above about 1200 rpm), in conjunction with the more gradual sloping second ramp surface, the swing weights tend to create an undesirable impact noise during engine speed increase that may be audible within the cabin of the vehicle. Additionally, second stops are typically provided to arrest the movement of the swing weights during engine deceleration. Since the conventional multi-ramp surface clutch will disengage as the swing weights traverse the more gradual sloping second ramp surface then the relatively steep first ramp surface, the swing weights may accelerate on the relatively steep first ramp surface and impact the second stops if engine speed decreases dramatically. This undesirable impact of the swing weights and the second stops will typically create an undesirable impact noise.

Accordingly, a need exists for an improved centrifugal clutch for a medium duty engine that avoids staggered disengagement of the centrifugally operated weights and reduces the undesirable impact noise associated with the stops.

SUMMARY

An embodiment provides a drive train for a medium duty truck. The drive train includes an engine having an engine output member, and a centrifugal clutch. The clutch has a plurality of swing weights and a driving member. The driving member generally defines an axis and is rotatable with the engine output member. The clutch also includes a ramp portion having a generally planar ramped surface portion in selective engagement with at least a portion of the swing weights, and a clutch disk portion for transferring torque from the driving member to a driven member. The clutch is operable between an engaged condition and a disengaged condition. The swing weights are radially moveable with respect to the axis. Radial movement of the swing weights causes axial movement of at least a portion of the clutch between a disengaged position and an engaged position. The swing weights engage only the ramped surface portion when the at least a portion of the clutch is not in the disengaged position.

Another embodiment provides a method of transferring torque from an engine to a transmission in a medium duty truck. The method includes increasing the speed of the engine and urging, at least partially through centrifugal force, a weight member away from a clutch axis. The method also includes urging a plate member toward a friction pad. The step of urging the plate member is at least partially in response to the step of urging the weight member. The method further includes engaging an output portion of the engine with a portion of the transmission for rotation therewith. The step of urging the plate member is initiated and completed as the weight member contacts a generally planar ramp surface.

DETAILED DESCRIPTION

Figure 1:
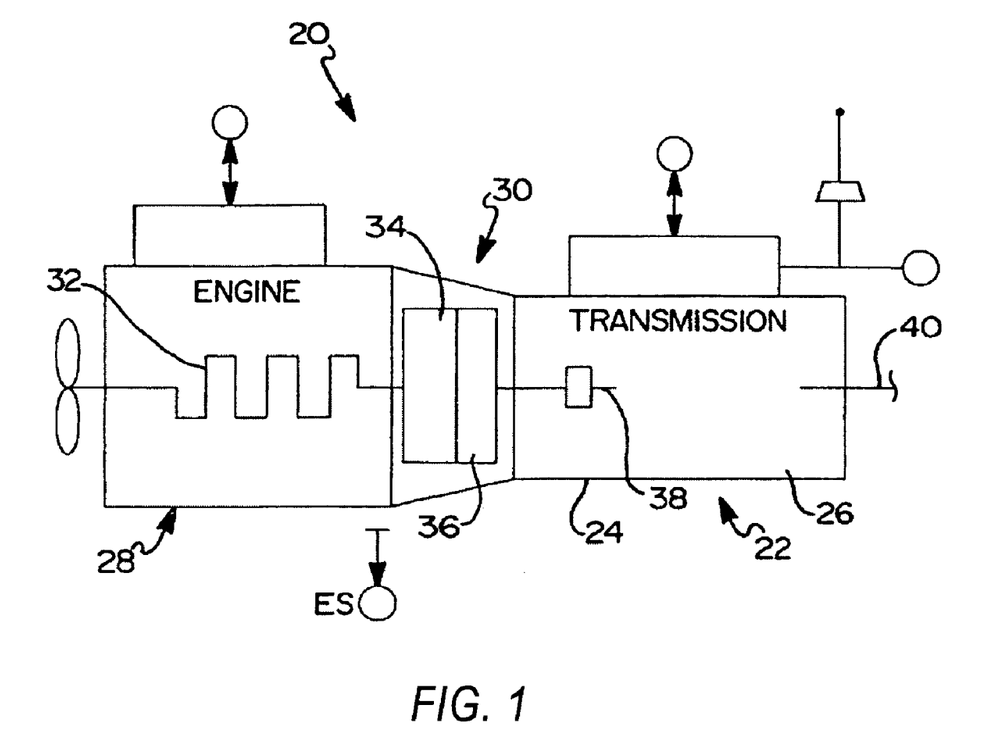
FIG. 1 is a schematic illustration of a vehicular drive train system.

A vehicular drive train system 20 employing a centrifugally operated master friction clutch is schematically illustrated in FIG. 1. By way of example, system 20 may be fully automated, partially automated, or manual operated with controller assist.

In system 20, a change-gear transmission 22 comprising a main transmission section 24 connected in series with a splitter-type auxiliary transmission section 26 is drivingly connected to an internal combustion engine 28, such as a well-known gasoline or diesel engine, by a centrifugal master friction clutch 30 of the present invention. Transmission 22, by way of example, may be of the type well known in the prior art and sold by the assignee of this application, EATON CORPORATION, under the trademarks "Super-10" and "Lightning", and may be seen in greater detail by reference to U.S. Pat. Nos. 4,754,665; 6,015,366; 5,370,013; 5,1004,906; and 5,1004,354, the disclosures of which are incorporated herein by reference.

Engine 28 includes a crankshaft 32, which is attached to a driving member 34 of centrifugal master clutch 30 that frictionally engages with, and disengages from, a driven member 36 attached to an input shaft 38 of transmission 22. A transmission output shaft 40 extends from the auxiliary transmission section 26 for driving connection to the vehicular drive wheels, as through a drive axle or transfer case (not shown).

The terms "engaged" and "disengaged" as used in connection with a master friction clutch refer to the capacity, or lack of capacity, respectively, of the clutch to transfer a significant amount of torque. Mere random contact of the friction surfaces, in the absence of at least a minimal clamping force, is not considered engagement.

As may be seen from a FIG. 1, centrifugal clutch 30 requires no external clutch actuator and is operated as a function of the rotational speed (ES) of engine 28. Centrifugal clutch 30 also requires no connections to operating linkages, command signal inputs, power electronics and/or compressed air and/or hydraulic conduits. The most economical application of the present invention is a dry clutch; however, the present invention is also applicable to wet clutch technology.

As is known, rotation of input member 34 will cause clutch 30 to engage and drivingly connect the engine output, usually an engine flywheel or the like, to transmission input shaft 38. The clamping force, and thus the torque transfer capacity of clutch 30 is a function of the rotational speed (ES) of engine 28 and clutch input member 34. Clutch 30 should reach incipient engagement at an engine speed slightly greater than engine idle, and should fully engage at an engine speed lower than the engine speed at which a first upshift is required. Unlike typical spring applied master friction clutches, which are normally engaged, clutch 30 is disengaged at lower engine speeds.

To allow proper vehicle launch and dynamic shifting with the master clutch engaged, clutch 30, once fully engaged, should remain fully engaged at engine speeds greater than (i) the highest expected speed at which downshifts are initiated and (ii) the minimum expected engine speed after an upshift. Incipient engagement of clutch 30 is the initial torque transfer contact of clutch friction surfaces as may be seen by reference to U.S. Pat. Nos. 4,646,891 and 6,022,295, the disclosures of which are incorporated herein by reference.

Figure 2:
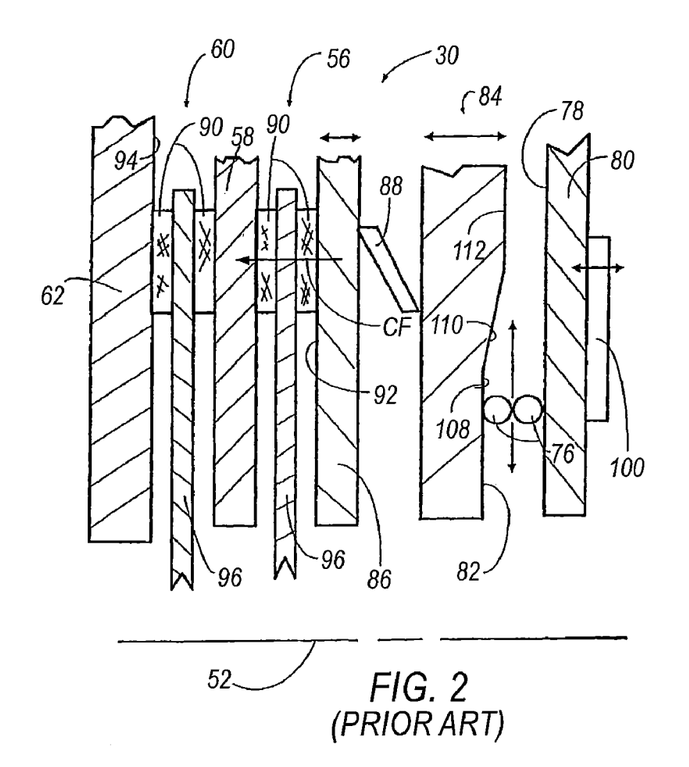
FIG. 2 is a schematic partial sectional view of a prior art centrifugal clutch.
Figure 3:
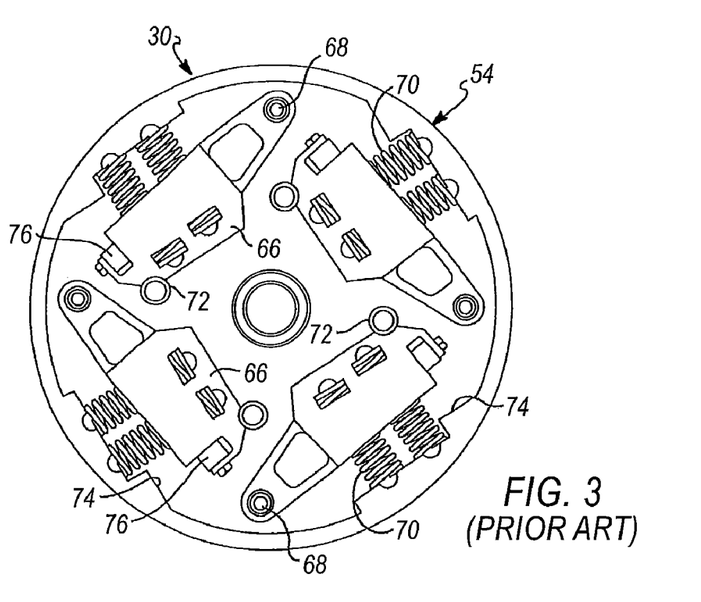
FIG. 3 is a partial end view, in section with section graphics omitted for clarity, of a cover module of the prior art clutch of FIG. 2, showing the clutch in a disengaged state.

To fully appreciate the features of the present invention, reference is made to a prior art centrifugal clutch 30 shown in FIGS. 2 and 3. FIG. 2 illustrates the operational components of clutch 30 shown in fragments as rotating about a rotational axis 52 of input shaft 38. Clutch 30 includes a cover module 54 (FIG. 3), a first friction disc assembly 56, an intermediate pressure plate 58, and a second friction disc assembly 60. As is well known from conventional clutches, cover module 54 and intermediate pressure plate 58 mount to an engine flywheel 62 for rotation therewith and comprise the driving portion of clutch 30. Friction disc assemblies 56 and 60 are typically splined to transmission input shaft 38 and comprise the driven portion of clutch 30.

As shown in FIG. 3, cover module 54 includes four swing weights 66, which are movably attached to cover module 54 at pivot pins 68. Return springs 70 bias swing weights 66 radially inwardly to rest on a first stop member 72. A second stop member 74 limits the radially outward movement of swing weights 66. As engine 28 and cover module 54 rotate, the effect of centrifugal force will cause swing weights 66 to move against the biasing force of springs 70 from a position abutting stops 72 toward stops 74. Swing weights 66 each carry one or more rollers 76, which act between a reaction surface and a ramp to provide an axial clamping force for engaging clutch 30.

As shown in FIG. 2, rollers 76 are received between a substantially flat surface 78 of a fixed reaction plate 80 and a ramped surface 82 of an axially movable ramp plate 84. Ramp plate 84 acts on an axially movable main pressure plate 86 through a preloaded spring member 88, which limits the axial force applied to the main pressure plate 86 by ramp plate 84. Main pressure plate 86 applies a clamping force CF on friction pads 90 of the friction plates, which are trapped between surface 92 of main pressure plate 86 and intermediate pressure plate 58 and between intermediate pressure plate 58 and surface 94 of engine flywheel 62. Hub portions 96 of friction plates 56 and 60 are adapted to be splined to input shaft 38 for rotation therewith while plates 80, 84, 86, and 58 rotate with engine flywheel 62. Clutch 30 also includes an adjustment mechanism 100 for modifying the axial position of reaction plate 80 to accommodate wear in friction pads 90 and, accordingly, maintain a more consistent engagement point.

At rest, rollers 76 will engage a recessed portion 108 of ramp surface 82 and will not apply a leftward axial clamping force to friction pads 90. As rollers 76 travel sufficiently radially outwardly, and onto a ramped portion 110 of ramp surface 82, an increasing axial clamping force is applied. As rollers 76 move further radially outwardly onto a flat extended portion of 112 of ramp surface 82, the clamping force will remain at a capped value as limited by preloaded spring member 88. The swing weights 66 will hit stops 74 prior to full compression of springs 70.

As wear occurs in friction pads 90, rollers 76 will be required to travel farther up ramped portion 110 to apply a given clamp load during clutch engagement. This wear, and the corresponding increased outward movement in swing weights 66, causes the engagement point of clutch 30 to change due to the increased compression of biasing springs 70.

As the centrifugal force increases and overcomes the preload of spring member 88, swing weights 66 will move from ramped portion 110 onto the relatively flat extended portion 112 of surface 82. Once on flat extended portion 112, clutch 30 can transmit a given torque at a lower engine speed without the swing weights 66 traveling back down ramped portion 110. This feature is desired in commercial vehicles due to the high torque demand at relatively lower engine speeds. Because clutch 30 operates based on a balance of forces, any tolerance in the springs, compression of the springs or the dimensions of surfaces 110, 112, for example, may cause one or more of swing weights 66 to prematurely move from flat extended portion 112 onto ramped surface 110, resulting in a staggered disengagement of swing weights 66. The following table illustrates the effects of a staggered disengagement on an exemplary implementation of the prior art centrifugal clutch that includes four (4) swing weights:

TABLE 1

| | | |
|---|---|---|
| Number of Swing Weights Engaged | 4 | 3 |
| Number of Swing Weights Disengaged | 0 | 1 |
| Load On All Swing Weights (Lbf) | 3820 | 3157 |
| Load On Each Disengaged Swing Weight (Lbf) | 0 | 292 |
| Load On Each Engaged Swing Weights (Lbf) | 955 | 955 |
| Additional Return Force Applied To Engaged Swing Weight (Lbf) | 0 | 0 |

As shown in the Table 1, when swing weights 66 are engaged, the load on all of the swing weights 66 collectively is about 3820 Lbf. In the above example, since there are four swing weights, the load on each engaged swing weight 66 is about 955 Lbf (3820 Lbf/4 engaged swing weights). If one of the swing weights 66 prematurely disengages from the generally flat surface 112 of ramp surface 82 and moves onto ramped portion 110 of ramp surface 82, the disengaged swing weight 66 is subjected to a lesser load than the engaged swing weights (e.g., 292 Lbf) since there is still some centrifugal force acting on the swing weight positioned on ramped portion 110. Because return springs 70 act on each swing weight 66 individually, there is generally no additional return force imposed on each of the remaining engaged swing weights. In other words, the load on each engaged swing weight remains at about 955 Lbf (3157 Lbf−292 Lbf/3 engaged swing weights). Thus, in clutch 30, there is generally no additional return force applied to the remaining engaged swing weights after one or more of the swing weights prematurely disengage.

Figure 4:
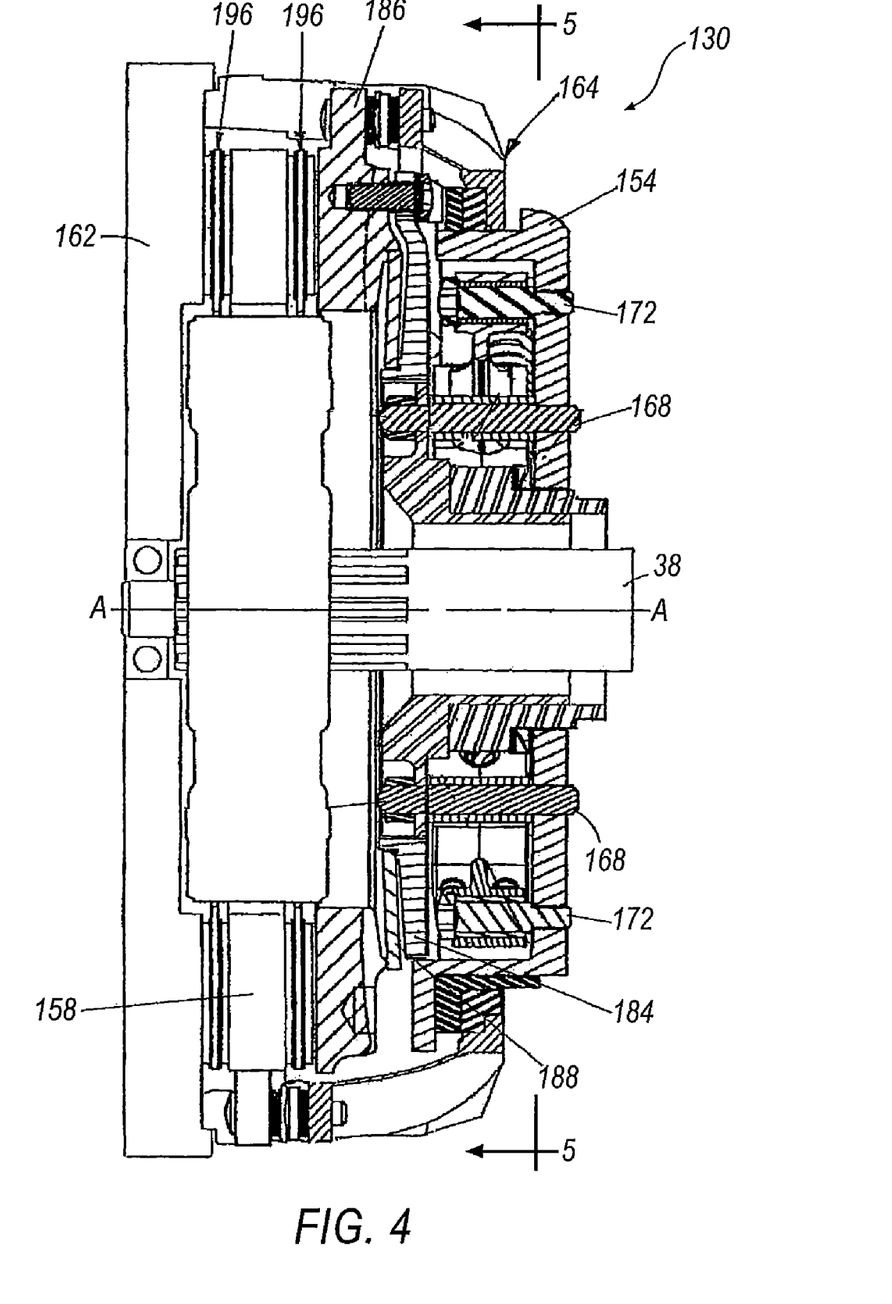
FIG. 4 is a partial sectional side view of a centrifugal clutch according to an embodiment.
Figure 5:
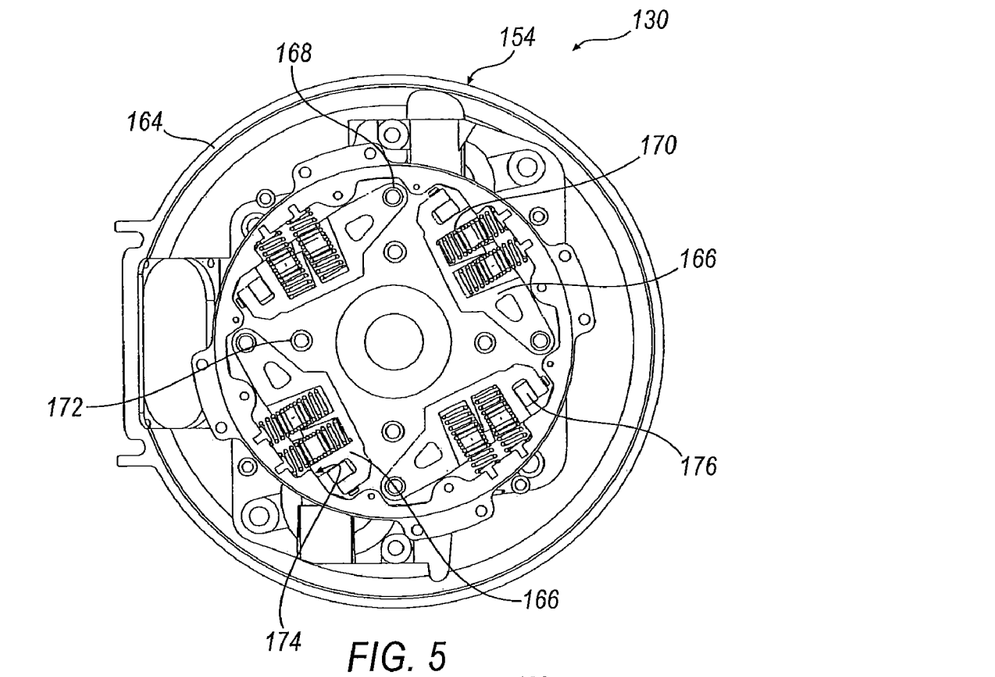
FIG. 5 is a partial sectional end view of the centrifugal clutch of FIG. 4, with a portion of the cover removed for clarity, showing the clutch in an engaged state.
Figure 6:
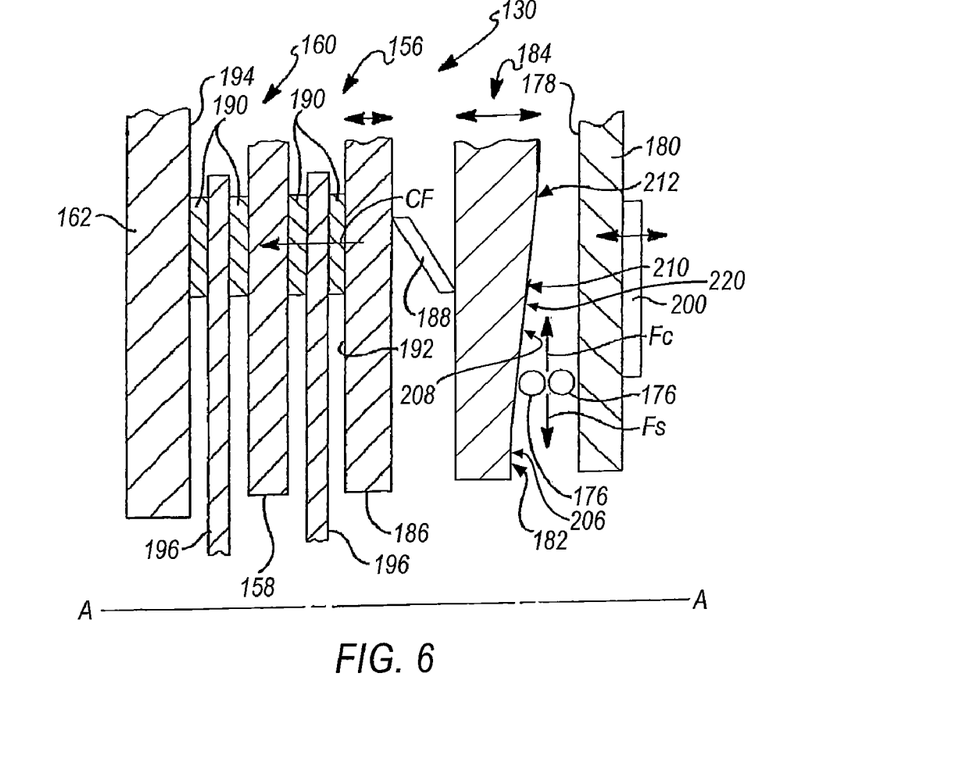
FIG. 6 is a schematic partial sectional view of the centrifugal clutch of FIG. 4, with some section graphics omitted for clarity.

FIGS. 4-6 illustrate a centrifugal clutch 130, according to an embodiment. FIG. 6 illustrates the operational components of clutch 130 shown in fragments as rotating about a rotational axis A-A of input shaft 38. Clutch 130 includes a cover module 154 (FIG. 5), a first friction disc assembly 156, an intermediate pressure plate 158, and a second friction disc assembly 160. As is well known from conventional clutches, cover module 154 and intermediate pressure plate 158 mount to an engine flywheel 162 for rotation therewith and comprise the driving portion of clutch 130. Friction disc assemblies 156 and 160 are typically splined to transmission input shaft 38 and comprise the driven portion of clutch 130. Clutch 130 also includes a cover housing 164.

As shown in FIGS. 5 and 6, cover module 154 includes four swing weights 166, which are movably attached to cover module 154 at pivot pins 168. Return springs 170 bias swing weights 166 radially inwardly to rest on a first stop member 172. A second stop member 174 is formed on the cover housing 164 and limits the radially outward movement of swing weights 166. As engine 28 and cover module 154 rotate, the effect of centrifugal force will cause swing weights 166 to move against the biasing force of springs 170 from a position abutting stops 172 toward stop surfaces 174. Swing weights 166 each carry one or more rollers 176, which act between a reaction surface and a ramp to provide an axial clamping force for engaging clutch 130. As best illustrated in FIG. 6, the return springs 170 exert a spring force, illustrated as Arrow $F_S$, on swing weights 166 and rollers 176.

As shown in FIG. 6, rollers 176 are received between a substantially flat surface 178 of a fixed reaction plate 180 and a ramp plate surface 182 of an axially movable ramp plate 184. While the ramp plate surface 182 is illustrated 2-dimensionally in FIG. 6 as a ramped, or beveled surface on the ramp plate 184, the ramp plate surface 182 may be a ramped surface, or a continuous or discontinuous generally frusto-conical surface. Ramp plate 184 acts on an axially movable main pressure plate 186 through a preloaded spring member 188, which limits the axial force applied to the main pressure plate 186 by ramp plate 184. That is, the ramp plate 184 applies an interim force on the preloaded spring member 188, and at least a portion of this interim force is applied to the main pressure plate 186.

Main pressure plate 186 applies a clamping force CF on friction pads 190 of the friction plates, which are trapped between surface 192 of main pressure plate 186 and intermediate pressure plate 158 and between intermediate pressure plate 158 and surface 194 of engine flywheel 162. Hub portions 196 of friction plates 156 and 160 are adapted to be splined to input shaft 38 for rotation therewith while plates 180, 184, 186, and 158 rotate with engine flywheel 162. Clutch 130 also includes an adjustment mechanism 200 for modifying the axial position of reaction plate 180 to accommodate wear in friction pads 190 and, accordingly, maintain a more consistent engagement point.

Figure 7A:
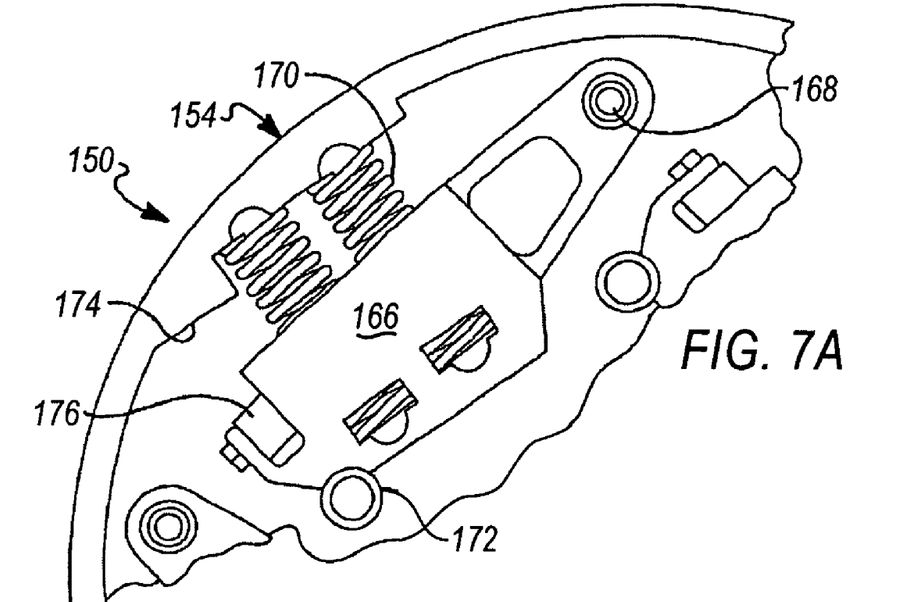
FIG. 7A is a partial end view, in section, of a cover module for the clutch of FIGS. 4-6 with section graphics omitted for clarity, showing the clutch in a disengaged state.

The ramp surface 182 includes an annular surface 206, an inner ramp portion 208, a mid ramp surface 210, and an outer ramp surface 212. As best seen in FIG. 7A, when the clutch 130 is not rotating, rollers 176 will engage the inner ramp portion 208 of ramp surface 182 and will not apply a leftward axial clamping force to friction pads 190. Generally, the stops 172 will prevent the rollers 176 from contacting the annular surface 206.

As best illustrated in FIG. 6, rotation of clutch 130 will exert a centrifugal force, illustrated as Arrow $F_C$, on swing weights 166 and rollers 176. As the rotational speed of the clutch 130 increases, the centrifugal force $F_C$ will increase. When the centrifugal force $F_C$ exceeds the spring force $F_S$, swing weights 166 will move away from the axis A-A generally in the direction of Arrow $F_C$ as the swing weights lift from engagement with the stops 172.

Figure 7B:
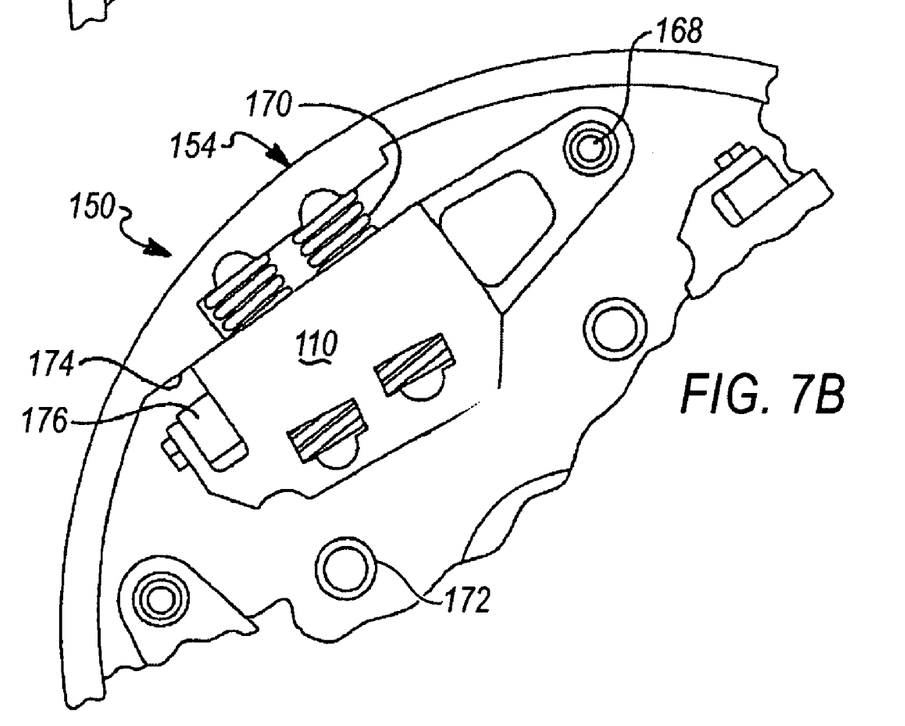
FIG. 7B is a partial end view, in section, of a cover module for the clutch of FIGS. 4-6 with section graphics omitted for clarity, showing the clutch in an engaged state.

As the speed of the clutch 130 increases, causing rollers 176 to travel sufficiently radially outwardly, along the mid ramp surface 210 of the ramp surface 182, an increasing centrifugal force $F_C$ will result in an increasing axial clamping force CF applied to the friction pads 190. As rollers 176 move further radially outwardly onto the outer ramp surface 212 of ramp surface 182, the clamping force CF will continue to increase until the swing weights contact the stop surfaces 174. The clamping force CF will increase to a desired maximum value as limited by preloaded spring member 188. The swing weights 166 will contact the stop surfaces 174 prior to full compression of springs 170, as illustrated in FIG. 7B.

As wear occurs in friction pads 190, rollers 176 will be required to travel farther up the mid ramp surface 210 to apply a given clamp load during clutch engagement. This wear, and the corresponding increased outward movement in swing weights 166, causes the engagement point of clutch 130 to change due to the increased compression of biasing springs 170.

The surfaces 208, 210, 212, when viewed normal the axis A-A as in FIG. 6, lie generally in a single plane. That is, the rollers 176 that contact the ramped surface 182 are in contact with a generally planar ramped surface portion 220 of surfaces 208, 210, 212 during axial movement of the ramp plate 184. Generally, the rate of axial movement of the ramp plate 184 will be proportional to the rate of radial movement of rollers 176 (with both rates taken with respect to the axis A-A) when the surface 178 is generally flat. The rollers 176 that each contact a surface portion of the ramp surface 182 will travel in generally a rectilinear path (with respect to the clutch housing 164 ) during axial movement of the ramp plate 184, since the rollers are guided on both surfaces 178 and 182. The surfaces 208, 210, 212, when viewed in orientations other than the view of FIG. 6 may exhibit some curvature.

With the rollers 176 in contact with generally a single plane during axial movement of the ramp plate 184, the swing weights 166 will not impact the stop 172 and stop surface 174 with an undesirable amount of force, as may happen with a multi-plane ramp surface 82. Preferably, the surfaces 208, 210, 212 are at an 11° angle with respect to the surface 206 when clutch 130 is mated to an engine that develops about 500 to about 550 ft·lb of torque at about 1450 rpm, although other ramp angles may be utilized. Generally, a higher ramp angle will result in a lower clamp rate and a higher wear capacity, and a lower ramp angle will result in a higher clamp rate and a lower wear capacity. Accordingly, the ramp angle may be tuned for the specific engine performance characteristics, operational characteristics of other components, and desired clutch performance.

Generally, an operator of a heavy duty truck is not aware of the impact between the swing weights 66 and the stops 72, 74. Primarily, this is due to greater insulation within the cab of a heavy duty truck and the production of a maximum engine torque at a low engine speed, such as 1100 rpm. Providing a single ramp plane 182 for the clutch 130 will lessen the impact of the swing weights 166 and the stop 172 and stop surface 174, thereby reducing wear and increasing reliability of the clutch 130.

The inventor has discovered that the complexity of a multi-ramp, or multi-frusto-conical surface centrifugal clutch is unnecessary when an engine, such as the engine 28, is a medium duty engine that develops maximum torque at a higher rpm than the typical heavy duty engine generally associated with a multi-ramp centrifugal clutch.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A drive train for a medium duty truck comprising:
   an engine having an engine output member; and
   a centrifugal clutch having a plurality of swing weights, a driving member generally defining an axis and rotatable with the engine output member, a ramp portion having a generally planar ramped surface portion in selective engagement with at least a portion of said swing weights, and a clutch disk portion for transferring torque from the driving member to a driven member, wherein said clutch is operable between an engaged condition and a disengaged condition, said swing weights are radially moveable with respect to said axis, radial movement of said swing weights selectively causes axial movement of at least a portion of said clutch between a disengaged position and an engaged position, and wherein said swing weights engage only said ramped surface portion of said ramp portion when said at least a portion of said clutch is not in the disengaged position.

2. The drive train of claim 1, further comprising a roller rotatably coupled to at least a portion of at least one of said plurality of swing weights, wherein said ramped surface is in selective contact with said roller.

3. The drive train of claim 1, wherein said engine develops about a maximum torque value at a speed of greater than about 1200 rpm.

4. The drive train of claim 1, wherein said engine develops about a maximum torque value at a speed of about 1400 to about 1500 rpm.

5. The drive train of claim 1, wherein said engine develops a maximum torque value of about 500 to 550 ft·lb.

6. The drive train of claim 5, further comprising a stop surface formed on said cover housing, wherein said stop surface limits travel of at least one of said plurality of swing weights.

7. The drive train of claim 1, further comprising a cover housing, wherein said swing weights are selectively positioned within said cover housing.

8. The drive train of claim 1, further comprising a plurality of return springs selectively urging said swing weights so as to place said clutch is in the disengaged condition.

9. A centrifugal clutch coupled to an engine for a medium duty truck comprising:
   a cover housing;
   a plurality of swing weights rotatably coupled to at least a portion of the clutch, wherein at least a portion of said plurality of swing weights has a pair of rollers rotatably attached thereto;
   a driving member generally defining an axis and rotatable with an engine output member;
   a ramp plate having a plurality of ramp portions, wherein at least a portion of said plurality of ramp portions is defined by a generally planar ramped surface portion in selective engagement with at least a portion of said rollers;

a clutch disk portion for transferring torque from the driving member to a driven member;

a preloaded spring member at least partially interposed between said ramp plate and said clutch disk portion;

a stop surface formed on said cover housing, wherein said stop surface limits travel of at least one of said plurality of swing weights; and a plurality of return springs selectively urging said swing weights so as to place said clutch is in the disengaged condition, wherein said clutch is operable between an engaged condition and a disengaged condition, said swing weights are radially moveable with respect to said axis, radial movement of said swing weights causes axial movement of at least a portion of said clutch between a disengaged position and an engaged position, and wherein said swing weights engage only said ramped surface portion of said ramp portion when said at least a portion of said clutch is not in the disengaged position.

10. A centrifugal clutch coupled to an engine for a medium duty truck comprising:

a plurality of swing weights;

a driving member generally defining an axis and rotatable with an engine output member;

a ramp portion having a generally planar ramped surface portion in selective engagement with at least a portion of said swing weights; and a clutch disk portion for transferring torque from the driving member to a driven member, wherein said clutch is operable between an engaged condition and a disengaged condition, said swing weights are radially moveable with respect to said axis, radial movement of said swing weights causes axial movement of at least a portion of said clutch, and wherein said swing weights engage only said ramped surface of said ramp portion when said clutch is in the engaged condition.

11. The clutch of claim 10, wherein the engine develops about a maximum torque value at a speed of greater than about 1200 rpm.

12. The clutch of claim 10, wherein said engine develops about a maximum torque value at a speed of about 1400 to about 1500 rpm.

13. The clutch of claim 10, wherein said engine develops a maximum torque value of about 500 to 550 ft·lb.

14. The clutch of claim 10, further comprising a cover housing, wherein said swing weights are selectively positioned within said cover housing.

15. The clutch of claim 14, further comprising a stop surface formed on said cover housing, wherein said stop surface limits travel of at least one of the swing weights.

16. A method of transferring torque from an engine to a transmission in a medium duty truck, the method comprising the steps of:

increasing the speed of the engine;

urging, at least partially through centrifugal force, a weight member away from a clutch axis;

urging a plate member toward a friction pad, wherein said step of urging the plate member is at least partially in response to said step of urging the weight member; and engaging an output portion of the engine with a portion of the transmission for rotation therewith;

wherein said step of urging the plate member is initiated and completed as said weight member only contacts a generally planar ramp surface portion of a ramp portion of said plate member.

17. The method of claim 16, further comprising the step of urging the weight member toward the axis.

18. The method of claim 16, further comprising the step of applying a clamping force on a plurality of friction pads.

19. The method of claim 16, wherein said step of urging the plate member includes the step of guiding a roller along the generally planar ramp surface portion, wherein the roller is rotatably coupled to the weight member.

20. The method of claim 16, further comprising the step of applying an interim force on a preloaded spring member.

* * * * *